June 6, 1961 R. H. GENTRY, JR., ET AL 2,986,925
CONTINUOUS VISCOSIMETER UTILIZING A THERMISTOR
Filed May 9, 1957 3 Sheets-Sheet 1

INVENTORS:
Robert H. Gentry, Jr.
Steno F. Micheletti
BY
Everett A. Johnson
ATTORNEY INVENTORS:
Robert H. Gentry, Jr.
Steno F. Micheletti INVENTORS:
Robert H. Gentry, Jr.
Steno F. Micheletti
BY
Everett A. Johnson
ATTORNEY

2,986,925
CONTINUOUS VISCOSIMETER UTILIZING A THERMISTOR

Robert H. Gentry, Jr., and Steno F. Micheletti, Galveston, Tex., assignors, by mesne assignments, to Standard Oil Company, Chicago, Ill., a corporation of Indiana
Filed May 9, 1957, Ser. No. 658,164
8 Claims. (Cl. 73—54)

This invention relates to testing apparatus and more particularly pertains to a system for continuously measuring viscosity of a flowing stream.

In many refinery operations there is a need for measuring viscosity continuously and to control product quality in accordance with such measurement. Examples of operations in which devices of this type may be used are the blending of lubricating oils and of asphalt. Another is the continuous viscosity measurement of a distillate product for controlling the distillation conditions and the like.

Primary requisites for such an instrument are accuracy, short response time, simplicity of operation, and dependability. Many devices have heretofore been proposed but none meets the rigorous requirements demanded by the petroleum and chemical industries. When it is required to submit a sample for test to an inspection laboratory it requires considerable time for making the determination and for reporting the information to the plant operator. In any event it has not been possible heretofore for such an inspection laboratory to maintain continuous and timely control of the operation in question.

It is therefore a primary object of this invention to provide an instrument for continuously determining the viscosity of a blended stream with such accuracy and speed as to permit control of plant operations. A further object of the invention is to provide an instrument which is dependable and simple to operate. An additional object of the invention is to provide an instrument having a short response time and one which can continuously measure the viscosity within the accuracy of the inspection laboratory analyses.

Another object of the invention is to provide a system wherein the sample can be returned after test to the product line. Additionally it is an object of the invention to provide an instrument that is particularly useful where line pressures and temperatures tend to fluctuate over wide ranges. These and other objects of the invention will become apparent as the description thereof proceeds.

Briefly according to the invention, the liquid from a product line is diverted by a sample line to a pressure regulator and thence to a flow sensing device, the regulator and sensing device being maintained within a controlled temperature bath. By keeping a constant head and constant back pressure on the system the resulting rate of flow can be detected by the flow sensing device and this can be correlated to the viscosity of the sample. The flow sensing device embodies a heated thermistor and the heat dissipation from the thermistor due to changes in viscosity reflected by changes in rate of flow at the controlled temperature is a measure of viscosity.

Further details of the construction and advantages of the apparatus in accordance with my invention will be apparent to those skilled in the art as the description thereof proceeds with reference to the accompanying drawings wherein.

Figure 1:
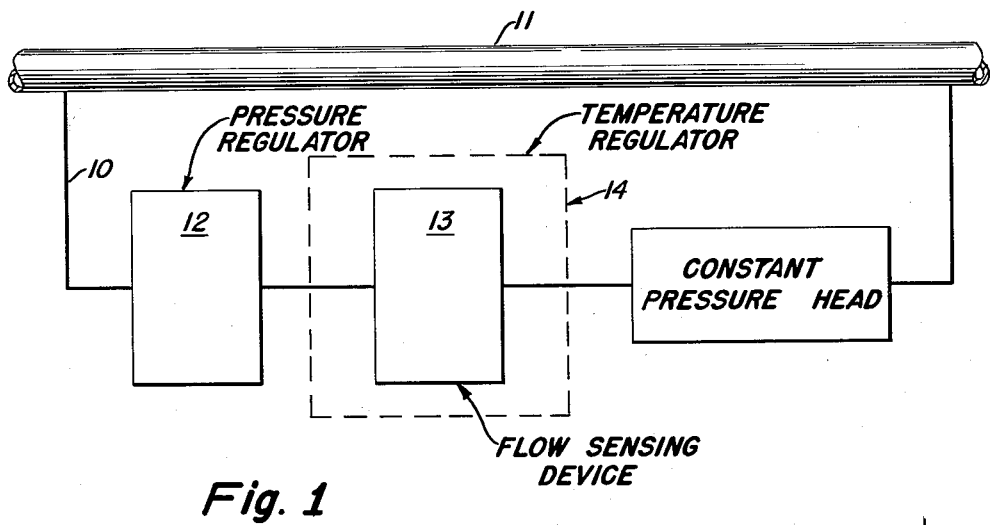
FIGURE 1 is a diagrammatic representation of the system.

Referring to the drawings, a side stream 10 is diverted from the product line 11 through the pressure regulator 12 into the flow sensing device 13. The sensing device 13 is maintained within a thermistated bath 14. The sensing device 13 comprises a thermistor 15 mounted in a probe 16 which is maintained in heat exchange with the flowing stream passing through the sensing device 13.

The power input to the thermistor 15 is such that it raises its temperature well above its surroundings and the rate at which heat is removed by the flowing stream in line 10 is a measure of flow rate and hence of viscosity at the controlled temperature.

The heat removal is generally measured by the use of a bridge circuit; however, some advantages can be obtained by using the negative resistance characteristics of the thermistor 15 in a self-regulating system, in which change of temperature of the thermistor 15 causes a change of current therethrough, thereby restoring the voltage drop across the thermistor 15 to its original value. A measure of the current flowing in the thermistor 15 can then be related to viscosity.

Figure 4:
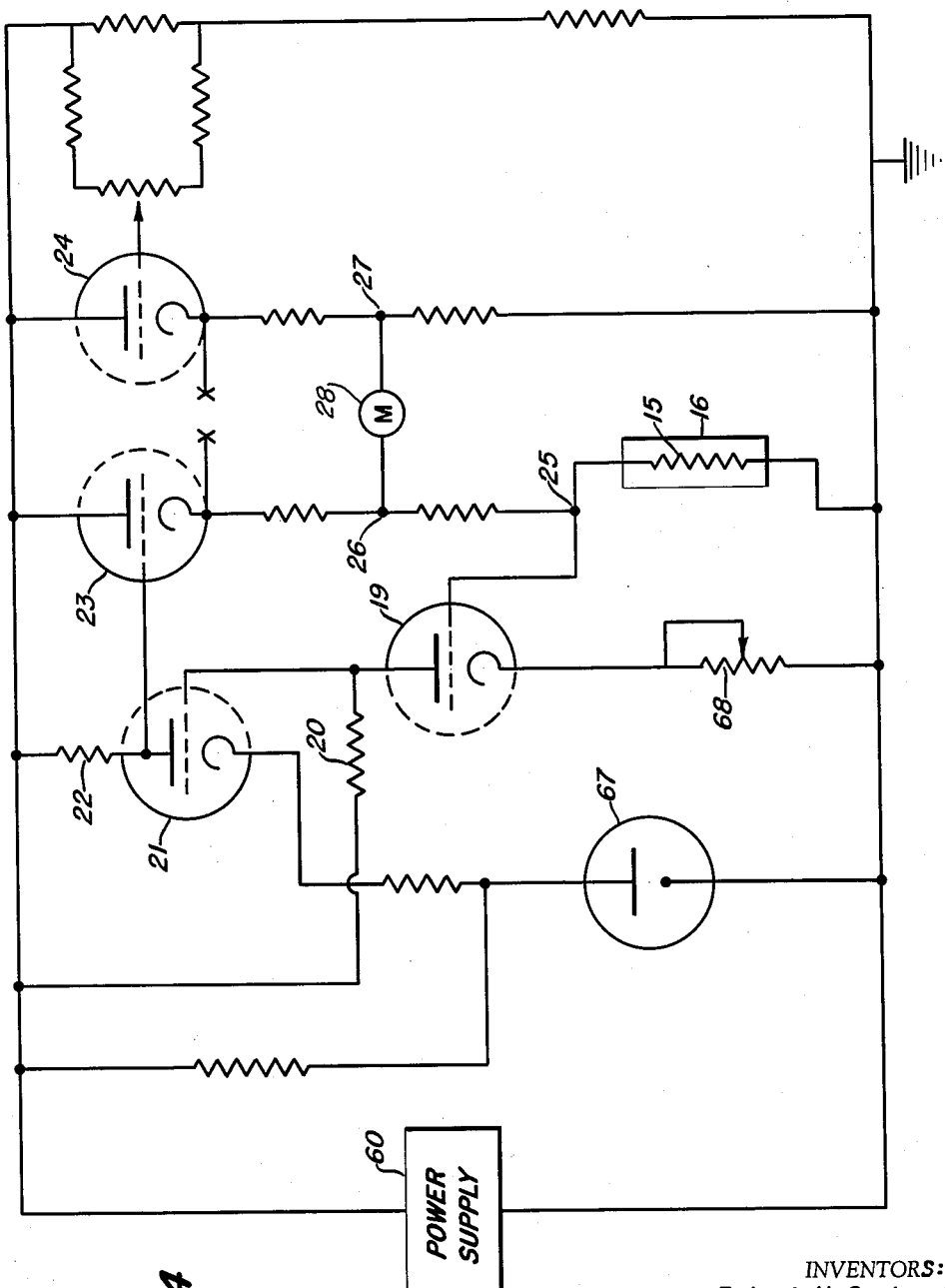
FIGURE 4 illustrates a circuit diagram adapted for use in sensing viscosity changes.

A typical circuit designed to give such indications is illustrated by FIGURE 4. Let us assume that $R_t$ is the thermistor 15 mounted in the flow sensing device 13. In the circuit shown, it would have a nominal resistance of 500 ohms and its operating temperature, which is considerably above that of the material surrounding it, is in the negative resistance characteristic range. As the viscosity increases, the velocity through the flow sensing device 13 will decrease, less heat will be dissipated by the thermistor 15 and thus the temperature of the thermistor 15 will increase, thereby dropping its resistance and lowering the voltage at 25. This causes an increased bias on tube 19, causing less voltage drop across its plate load resistor 20 decreasing the bias of tube 21. This in turn causes an increased drop across its plate-load resistor 22 and thereby increases the bias on tube 23. This increased bias results in a drop in current in tube 23, the drop being such that the resistance of the thermistor 15 is increased and the voltage at 25 reaches a new equilibrium value corresponding to the viscosity of the material under test. This value 25 will be dependent on the circuit constants and the total circuit gain, the greater the gain the more sensitive the instrument, since the new voltage at 25 will more nearly approach the old value.

Tube 24 is used as a balance tube so that a meter or recording device 28 can be used to measure the degree of unbalance between the points 26 and 27.

Figure 5:
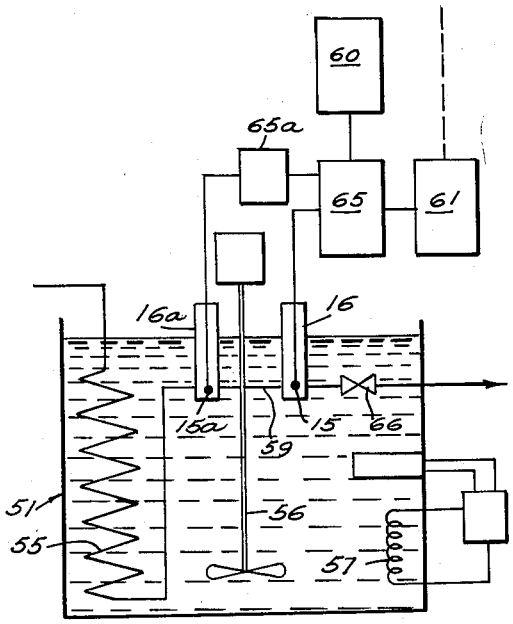
FIGURE 5 illustrates another embodiment of the invention.

In another system we may provide a pair of probes 16 and 16a as shown in FIGURE 5 containing two thermistors 15 and 15a, one thermistor 15 for measuring the velocity of flow as described in the foregoing paragraph, by operating at a high temperature to measure heat dissipation, and the other thermistor 15a operating at the temperature of the flowing material. The thermistor operating at this latter temperature would be used in conjunction with electronic circuits 65a available to those skilled in the art to develop a voltage to compensate for minor fluctuation in the temperature of the flowing stream. This type of setup simplifies the thermostating of the apparatus.

Figure 3:
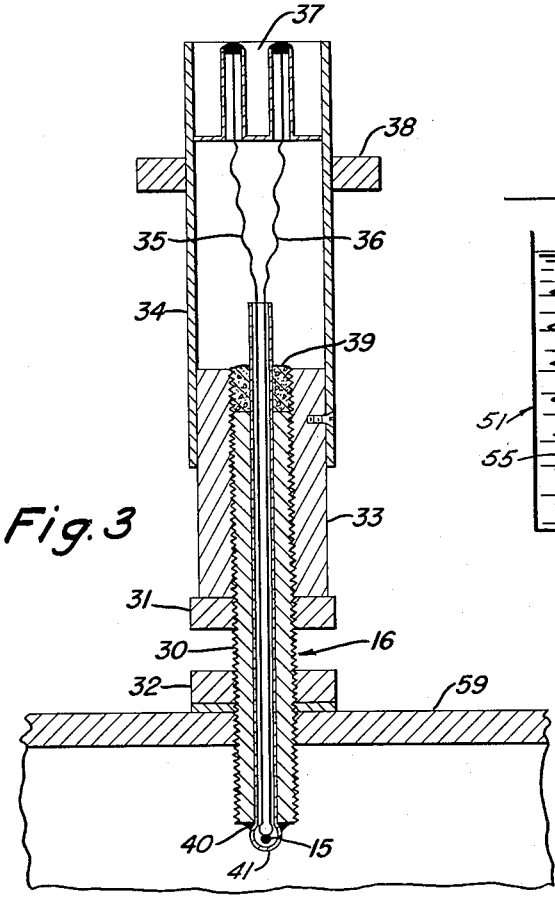
FIGURE 3 illustrates a flow sensing element embodying a thermistor and adapted for use in our apparatus.

Referring to Figure 3 the thermistor assembly or probe 16 includes the thermistor 15 supported within a threaded cylinder 30 which is secured by lock-nuts 31 and 32 to internally threaded collar 33 which in turn is fixed to the connector tube 34, the connector tube 34 accumulating the thermistor leads 35 and 36 which terminate in male plug 37. A connector union 38 completes the assembly.

Each end of the externally threaded cylinder 30 supporting the thermistor 15 is sealed by ceramic plugs 39 and 40. The thermistor 15 itself is protected by the wire loop cage 41 also set in the plugs 39 and 40.

Figure 2:
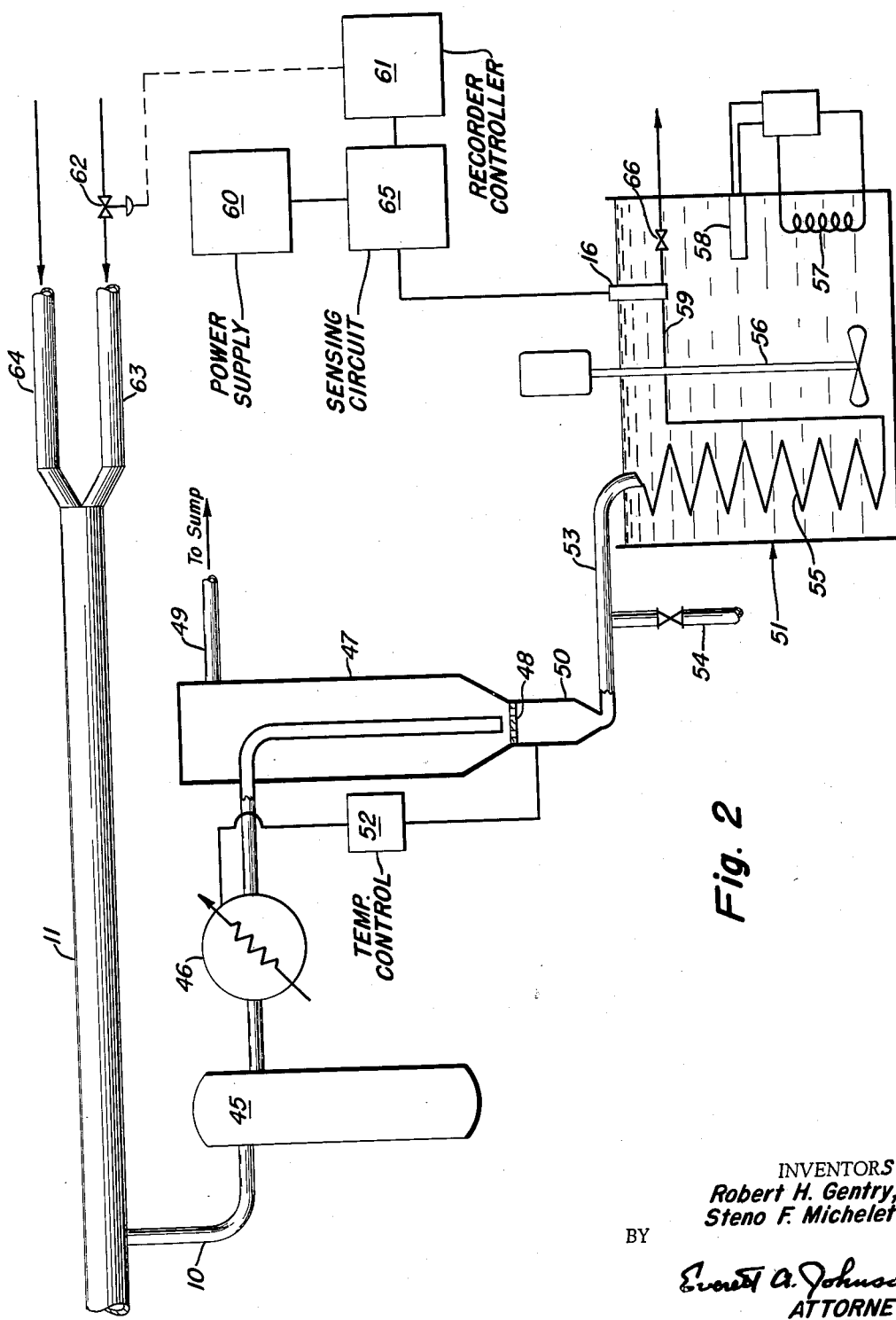
FIGURE 2 shows schematically the components of an installation wherein product viscosity controls asphalt blending.

In Figure 2 we have illustrated a system for blending asphalt wherein a sample is continuously withdrawn via line 10 from the blended product line 11, introduced into surge drum 45 from which it flows through heat exchanger 46 and into sampling chamber 47 which is provided with a baffle 48 comprising a perforated plate near the base thereof, and an outlet conduit 49 discharging from the sampling chamber 47 to a sump. Below the baffle 48 is a manifold 50 from which the ultimate sample flows enroute to the viscosimeter assembly 51. A temperature control 52 is maintained between the manifold 50 and the heat exchanger 46.

The ultimate sample flows from the manifold 50 through transfer line 53 which discharges into the preheater coil 55 disposed within the constant temperature viscosimeter assembly 51. A motor driven stirrer 56, an electrical heater 57, and thermal switch 58 complete the constant temperature viscosimeter assembly 51.

The preheated sample passes through the viscosimeter tube 59 into which the thermistor probe 16 extends as shown in FIGURE 3. The probe 16 in FIGURE 2 is connected in electrical circuit 65 illustrated by FIGURE 4 with which is associated the power of supply 60 and the recorder-controller 61. The recorder-controller 61 actuates the valve 62 in blending line 63 so as to automatically adjust the viscosity of the blending to obtain the desired blended asphalt product flowing in product line 11.

The manifold 50 is maintained at about 130° F. in a typical installation and the constant temperature bath is maintained at 140° F. ± 0.05° F. Back pressure on the viscosimeter tube 59 is maintained constant by pressure regulator 66 whereby flow can be controlled through the instrument 51. If desired the increment of the sample discharged from the viscosimeter tube 59 can be discharged into sump line 49 for full recovery of the total and incremental samples.

From the above description it will be apparent that we have attained the objects of our invention and have provided a method and means for accurate measurement and recording of viscosity of a flowing stream. Although we have described our invention in terms of preferred examples of apparatus components, it should be understood that these are by way of illustration only and that our invention is not necessarily limited thereto. Alternative embodiments will become apparent to those skilled in the art in view of our description of the invention and accordingly modifications therein are contemplated without departing from the spirit and scope thereof.

What we claim is:

1. A continuous flow viscosimeter including a heat exchanger means, a conduit through said exchanger means, means for flowing a stream through said conduit means, means for maintaining a constant pressure head across a portion of said conduit means, thermistor temperature sensing means in heat exchange relation with said portion, means for heating said thermistor to a temperature level substantially above that of said portion, and means for measuring the rate of heat removal from the said thermistor by the flowing stream through said portion as a measure of the viscosity of said stream.

2. The viscosimeter of claim 1 wherein said means for measuring the rate of heat removal comprises an indicator and an electrical bridge circuit including said thermistor and said indicator.

3. An apparatus for continuous measurement of the viscosity of a flowing stream including a product line, a sample line connected to said product line, said sample line comprising a side loop of said product line, first pressure regulator means on said sample line, a constant pressure head regulator downstream of said first pressure regulator means, flow-sensing means interposed said first and second pressure regulators, constant temperature chamber means, said flow-sensing means being disposed within said constant temperature chamber means, a thermistor flow-responsive means in said flow-sensing means, means for heating said thermistor to a temperature substantially above that of the controlled temperature means, and means for balancing current flow through said thermistor to compensate for heat dissipation from said heated thermistor, the extent of adjustment necessary to maintain the balance being a measure of the viscosity of the liquid under test.

4. A continuous flow viscosimeter comprising in combination a constant temperature bath, conduit means for flowing a sample under test in a confined stream through said bath, a pressure regulator on said conduit means within said bath, a flow-sensing device on said conduit means disposed within said bath, said pressure regulator providing means for maintaining a constant back pressure on said flow-sensing device, and a thermistor probe in said flow-sensing device connected in a balanced electrical circuit means, the unbalance of said circuit accompanying changes in the temperature of said thermistor being an indication of the viscosity of said sample.

5. An apparatus for continuously measuring and recording the viscosity of a flowing stream of hydrocarbon liquids which comprises in combination a sample diversion line, means for maintaining a constant pressure head across a portion of said sample diversion line, constant temperature bath means for maintaining said portion of said line at a selected temperature level, thermistor circuit means having a thermistor element in heat exchange with the flowing sample in said portion of said sample diversion line, means for heating said thermistor substantially above the maintained temperature of said portion, and means for measuring the extent of unbalance in said thermistor circuit due to heat loss from said element to said flowing sample, the rate at which heat is dissipated by the flowing stream from the heated thermistor being a measure of viscosity.

6. An apparatus for sensing and indicating the viscosity of a flowing liquid stream which comprises in combination a constant temperature means, conduit means for flowing a liquid sample in heat exchange with said constant temperature means, pressure head regulator means on said conduit means, back-pressure regulator means on said conduit means downstream of said pressure head regulator means, test chamber means interposed said pressure head regulator means and said back-pressure regulator means and disposed within said constant temperature means, flow rate sensing means in said test chamber means comprising a heated thermistor means, probe means for supporting said thermistor means in heat exchange relationship with the stream flowing through said test chamber, and indicating means responsive to changes in heat dissipation from said heated thermistor due to changes in rate of flow through said test chamber caused by variations and viscosity of the stream flowing therethrough.

7. An apparatus for use in determining continuously the viscosity of a flowing liquid which comprises in combination a test chamber, means for maintaining said test chamber at a selected constant temperature, a viscosimeter tube in said chamber, means for maintaining a constant inlet pressure on said viscosimeter tube, means for maintaining a constant back pressure at the outlet of said viscosimeter tube, flow rate sensing means disposed within said viscosimeter tube and responsive to changes in rate of flow at said constant temperature, such changes in rate of flow resulting from changes in viscosity of the liquid under test, said flow rate sensing means comprising heated thermistor means, means for initially heating the thermistor means substantially above its surroundings in the test chamber, and means for indicating changes in the rate of dissipation of heat from said thermistor means as a measure of changes in the viscosity of the liquid under test.

8. An apparatus for a continuous measurement of viscosity of a flowing stream including a product line, a sample line connected to said product line, said sample line comprising a side loop of said main product line, first pressure regulator means on said sample line, a constant pressure head regulator downstream of said first pressure regulator means, flow-sensing means interposed said first and second pressure regulators, constant temperature chamber means, said flow-sensing means being disposed within said constant temperature chamber means, a thermistor flow-responsive means in said flow-sensing means, said thermistor means including a pair of matched thermistors, means for heating one of said thermistors to a temperature substantially above its surroundings, and means for balancing the current flow through said matched thermistors to compensate for heat dissipation from said heated thermistor, the extent of adjustment necessary to maintain balance being a measure of the viscosity of the liquid under test.

References Cited in the file of this patent

UNITED STATES PATENTS

| | | |
|---|---|---|
| 2,208,444 | Bailey | July 16, 1940 |
| 2,437,449 | Ames et al | Mar. 9, 1948 |
| 2,612,047 | Nilsson et al. | Sept. 30, 1952 |
| 2,791,902 | Jones | May 14, 1957 |
| 2,859,617 | Adams | Nov. 11, 1958 |